United States Patent
Weiss et al.

(10) Patent No.: US 12,442,348 B2
(45) Date of Patent: Oct. 14, 2025

(54) PISTON FOR AN INTERNAL COMBUSTION ENGINE

(71) Applicant: FEDERAL-MOGUL NURNBERG GMBH, Nuremberg (DE)

(72) Inventors: Rainer Weiss, Nuremberg (DE); Jens Lehmann, Nuremberg (DE); Michael Grabinger, Nurberg (DE); Christian Lindner, Bubenreuth (DE); Michael Scherer, Furth (DE); Ralf Meske, Schwabach (DE); Sven Ungermann, Stuttgart (DE)

(73) Assignee: FEDERAL-MOGUL NURNBERG GMBH, Nuremberg (DE)

( * ) Notice: Subject to any disclaimer, the term of this patent is extended or adjusted under 35 U.S.C. 154(b) by 0 days.

(21) Appl. No.: 18/682,272

(22) PCT Filed: Jul. 14, 2022

(86) PCT No.: PCT/EP2022/069743
§ 371 (c)(1),
(2) Date: Feb. 8, 2024

(87) PCT Pub. No.: WO2023/016745
PCT Pub. Date: Feb. 16, 2023

(65) Prior Publication Data
US 2024/0376849 A1     Nov. 14, 2024

(30) Foreign Application Priority Data
Aug. 10, 2021   (DE) ................. 10 2021 208 696.9

(51) Int. Cl.
F02F 3/28    (2006.01)
F02F 3/00    (2006.01)

(52) U.S. Cl.
CPC .............. *F02F 3/28* (2013.01); *F02F 3/0084* (2013.01)

(58) Field of Classification Search
CPC .................................. F02F 3/28; F02F 3/0084
See application file for complete search history.

(56) References Cited

U.S. PATENT DOCUMENTS

| | | | | |
|---|---|---|---|---|
| 1,492,397 A | * | 4/1924 | Roberts | F16J 9/18 |
| | | | | 92/158 |
| 3,712,099 A | * | 1/1973 | Elsbett | B23P 15/10 |
| | | | | 72/110 |
| 4,383,509 A | | 5/1983 | Bauer | |
| 4,809,652 A | * | 3/1989 | Essig | F02F 3/022 |
| | | | | 123/193.6 |

(Continued)

FOREIGN PATENT DOCUMENTS

| | | | |
|---|---|---|---|
| DE | 3928491 A1 | * | 3/1991 |
| DE | 19807176 A1 | | 10/1999 |

(Continued)

*Primary Examiner* — Kurt Philip Liethen
(74) *Attorney, Agent, or Firm* — Dickinson Wright PLLC

(57) ABSTRACT

A piston for an internal combustion engine includes at least one annular groove in the piston material, preferably the first annular groove closest to the piston crown, which is configured such that, when viewed in cross-section, at least one elliptic curve and/or convex cubic spline is present between a lower flank of the annular groove and an upper flank of the annular groove.

12 Claims, 1 Drawing Sheet

(56) References Cited

U.S. PATENT DOCUMENTS

Figure 1:
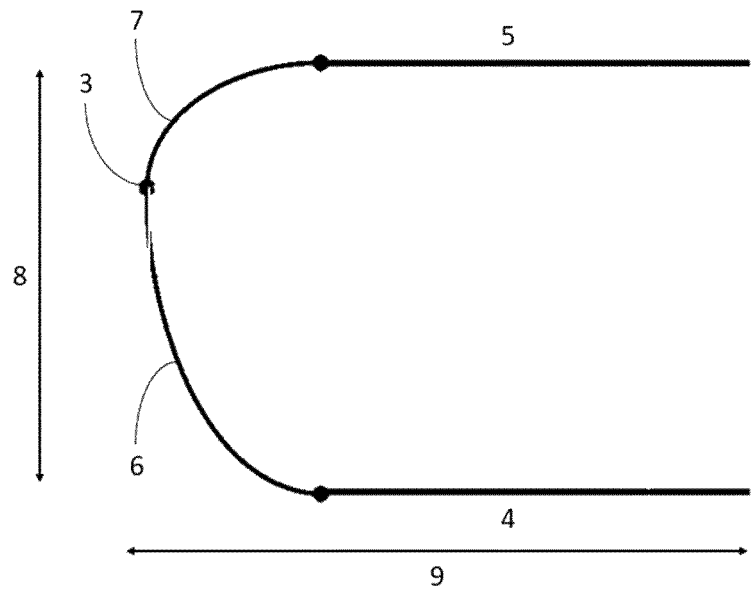

| | | | | |
|---|---|---|---|---|
| 5,224,428 A | * | 7/1993 | Wronkiewicz | B61F 5/52 |
| | | | | 105/167 |
| 6,883,418 B1 | * | 4/2005 | Greiner | F02F 3/022 |
| | | | | 92/169.1 |
| 2018/0030921 A1 | * | 2/2018 | Montgomery | F02F 3/022 |

FOREIGN PATENT DOCUMENTS

| | | |
|---|---|---|
| DE | 10127172 A | 12/2002 |
| DE | 102009027647 A1 | 1/2011 |
| DE | 102012204770 A1 | 9/2013 |
| DE | 102020200153 A1 | 7/2021 |
| WO | 2015040126 A1 | 9/2013 |

\* cited by examiner

PISTON FOR AN INTERNAL COMBUSTION ENGINE

BACKGROUND

1. Technical Field

The invention relates to a piston for an internal combustion engine, in particular an aluminium piston for an Otto engine, with improved ring land strength due to specific transition curves from the groove base to the flanks.

2. Related Art

Pistons are used in internal combustion engines to drive a motor vehicle via a crankshaft. The pistons move up and down inside the cylinder and are guided by the walls of the cylinder. The side walls of the pistons are provided with annular grooves in which piston rings are located that slide on the cylinder walls and thus seal the combustion chambers from the rest of the engine. As a result of the ignition pressure, in particular the first annular grooves are thereby exposed to high mechanical loads.

Due to increasing engine loads, high ignition pressures and combustion strategies that favor the occurrence of pre-ignition with localized, extreme, singular ignition pressure loads, also Otto pistons must today be increasingly reinforced in the first annular groove in order to prevent piston damage such as ring land fractures starting from the groove base in particular of the first annular groove.

A proven solution is to cast a reinforcement in the form of a so-called ring carrier made of a ferrous material (Ni-resist) into the region of the aluminium piston, into which the first annular groove is then machined. This has long been prior art for diesel pistons and, for the reasons cited above, has in recent years also been increasingly used for Otto pistons with higher loads.

However, this method involves significant additional costs due to the additional purchase of the cast part ring carrier, to increased processing effort in the foundry, to the increased efforts involved in machining the piston and to an increased risk of rejects (inadequate material bonding of the cast part). In addition, the cast part that is made of ferrous material increases the weight of an Otto piston, which must fundamentally be kept as low as possible for reasons of efficiency.

It is known from DE 3928491 A1 and WO 2015/040126 A1 to configure differently the circular radii to the upper and lower flanks that are apparent in cross-section.

SUMMARY

Against this background, an object is to provide a piston that can be manufactured in an efficient manner and at the same time has a low susceptibility to ring land fractures and a low weight.

The piston, in particular without a ring carrier, is for use in internal combustion engines, preferably in Otto engines. The piston is preferably made of aluminium or an aluminium alloy, but can also be made of steel or other materials.

It is proposed to configure the groove base curves of at least one, preferably the first annular groove such that, when viewed in cross-section, at least one elliptic curve and/or one convex cubic spline is present between the lower and/or upper flanks of the annular groove. Initial simulations have shown that this can further reduce the stress at the groove base compared to using a simple radius as the groove base curve. Furthermore, the dead space radially inside the inner side of the piston ring is advantageously reduced. In other words, the clearance volume behind the ring back is reduced as a result hereof, and a faster sealing effect of the first piston ring is achieved when the gas pressure increases.

It is mentioned that for both of the aforementioned curve shapes, it is preferred to form a tangential transition into the upper and/or lower flank of the groove. For the use of the cubic spline, a curvature-continuous transition into the upper and/or lower flank of the groove is also made possible.

Irrespective thereof, the manufacturing costs and weight can be reduced by the measures according to the invention. Taking a diameter of 82 mm as an example, the weight saving is in the order of 20 g as compared to a ring carrier piston.

In order to make particularly extensive use of the advantages of an elliptic curve as compared to a circular radius, the two semi-axes in at least one elliptical curve preferably differ by at least 5%.

Although other portions of a complete ellipse can be used, a quarter ellipse is preferred for at least one elliptic curve. This quasi automatically results in a tangentially continuous transition to the lower and/or upper flank of the groove as well as at the groove base, irrespective of whether a cylindrical portion is present there or not.

For at least one convex cubic spline, it is preferred for the same reason to configure at least one spline in such a manner that when the piston crown is horizontal, the horizontal extension of the transition curve to the lower or upper flank deviates by at least 5% from the vertical extension. It is mentioned at this point that also when referring in the following to horizontal and/or vertical extensions, viewing takes place with a horizontal piston crown.

In initial simulations, the aforementioned advantages could also be determined for a configuration in which the horizontal extension of the transition curve to the lower and upper flank is different. In other words, in at least one convex cubic spline, the reference points, designated O1 and O2 in the figures, and the transition point to the upper and lower flank are not at the same horizontal position.

This also applies to a configuration in which the groove base does not comprise a cylindrical portion, in other words the transition curve to the lower flank preferably merges into the transition curve to the upper flank in a continuous curve.

If the horizontal extension of the transition curve to the lower flank of the annular groove is smaller than the vertical extension, the stress applied by the ignition pressure is more evenly dissipated into the ring land region. The notch effect in this region is reduced and the occurrence of ring land fractures during stress peaks, which occur, for example, during pre-ignition events or knocking combustion, is delayed. The effectiveness in principle of this measure was proven by simulations.

In a preferred embodiment, the vertical extension of the transition curve to the lower flank is greater, preferably at least twice as great, particularly preferred at least three times as great as the vertical extension of the transition curve to the upper flank, as a result of which the above-described effect of improved ring land strength is further increased.

The vertical extension of the lower transition curve is therefore preferably more than half the groove height and the vertical extension of the upper transition curve is less than half the groove height. Due to the asymmetry, a significantly larger part of the groove height is used for the lower transition curve, as a result of which the above-described effect of improved ring land strength is further increased.

THE DRAWINGS

Figure 2:
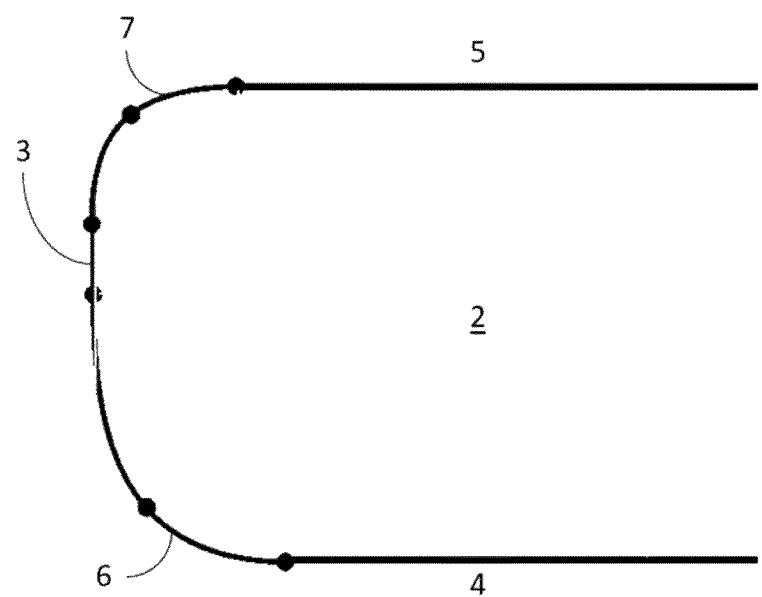

Preferred embodiment examples of the invention will be explained in more detail below with reference to the figures, in which:

FIG. 1 an enlarged cross-sectional view of the first annular groove of a piston according to the invention, and FIG. 2 an enlarged cross-sectional view of the first annular groove of a piston according to the invention in a second embodiment.

DETAILED DESCRIPTION

FIG. 1 shows an enlarged cross-sectional view of the first annular groove 2 of a piston according to the invention. This has a height 8 and a depth 9 and is delimited radially inwards by the groove base 3. The annular groove is delimited at the bottom and top by the lower flank 4 and the upper flank 5, respectively, which extend substantially perpendicular to the groove base 3 parallel to the piston crown. The lower transition curve 6, which is located at the transition between the groove base 3 and the lower flank 4 of the annular groove, and the upper transition curve 7, which is located at the transition between the groove base 3 and the upper flank 4 of the annular groove, are configured as quarter ellipses.

In the shown case, the vertical extension of the transition curve 6 to the lower flank 4 is greater than that of the upper transition curve 7. However, these merge tangentially continuously into one another and into the respective groove flank. In the shown case, the horizontal extension of the two transition curves is the same. However, this does not necessarily have to be the case and/or a cylindrical portion can be provided at the groove base 3.

Both measures are shown in the embodiment of FIG. 2. As a result hereof, the reference points O1 and O2 differ in their horizontal and vertical position. However, these positions can also be chosen to be the same in the embodiment of FIG. 2 and/or the cylindrical portion at the groove base 3 can be omitted. In contrast to the embodiment of FIG. 1, both transition curves in FIG. 2 are configured as convex cubic splines.

What is claimed is:

1. A piston for an internal combustion engine, comprising: at least one annular groove having an upper flank and a lower flank and configured such that, when viewed in cross-section, at least one portion of an ellipse is present between the lower flank of the annular groove and the upper flank of the annular groove.

2. The piston according to claim 1, wherein: the at least one annular groove, when viewed in cross-section, includes at least one convex cubic spline between the lower flank of the annular groove and the upper flank of the annular groove.

3. The piston according to claim 1, wherein the ellipse includes at least one elliptic curve having two semi-axes which differ by at least 5%.

4. The piston according to claim 1, wherein the ellipse includes at least one elliptic curve comprising a quarter ellipse.

5. The piston according to claim 2, wherein in the at least one convex cubic spline, when a piston crown of the piston is horizontal, a horizontal extension of a transition curve to the lower flank or upper flank deviates by at least 5% from a vertical extension.

6. The piston according to claim 5, wherein the horizontal extension of the transition curve to the lower flank and upper flank is different.

7. The piston according to claim 1, wherein the at least one annular groove includes a groove base which does not comprise a cylindrical portion.

8. The piston according to claim 1, wherein a piston crown of the piston is horizontal, a horizontal extension of the transition curve to the lower flank is smaller than a vertical extension.

9. The piston according to claim 1, wherein when a piston crown of the piston is horizontal, a vertical extension of a transition curve to the lower flank is greater than a vertical extension of the transition curve to the upper flank.

10. The piston according to claim 1, wherein the piston is made of aluminum or an aluminum alloy and/or does not comprise a ring carrier.

11. The piston according to claim 9 wherein the transition curve to the lower flank is at least twice as great as the vertical extension of the transition curve to the upper flank.

12. The piston according to claim 9 wherein the transition curve to the lower flank is at least three times as great as the vertical extension of the transition curve to the upper flank.

* * * * *